Patented Apr. 16, 1940

2,197,629

UNITED STATES PATENT OFFICE 2,197,629

ABRADING ELEMENT

Howard G. Bartling, Chicago, Ill., assignor to Minnesota Mining & Manufacturing Company, St. Paul, Minn., a corporation of Delaware No Drawing. Continuation of application Serial No. 413,679, December 12, 1929, also a division of Serial No. 422,066, January 20, 1930, now Patent No. 2,186,001, dated January 9, 1940. This application October 6, 1933, Serial No. 692,551

13 Claims. (Cl. 51—280)

One of the objects of this invention is to provide a bonding agent or cement, sometimes termed an adhesive coating, particularly adapted, though not necessarily limited in its use in the manufacture of sand or abrasive papers, for holding the abrasive grit grains on the supporting body or backing.

This application is a continuation of my application S. N. 413,679, filed December 12, 1929. This application is also a division of my application Serial No. 422,066, filed January 20, 1930, as a continuation-in-part of my said application Serial No. 413,679. My application Serial No. 422,066 issued on January 9, 1940 as Patent No. 2,186,001.

It has been the practice since the beginning of the art to employ bonding agents made from animal glue, gums, resins, varnishes and the like. However, since the introduction of phenol formaldehyde condensation products and cellulose, (both nitrate and acetate), many attempts have been made to use them as bonding agents for this purpose.

The bonding agent or cement covered by this invention may be used for both the waterproof varieties and glue-bond sandpapers. The latter are so classed because, being used exclusively for sanding without a lubricating agent, the water soluble glue is satisfactory, while in the former, and being for use with water as the lubricating agent, the bond should be waterproof.

One of the chief ingredients of the present binding agent or cement is an isomeric composition, such as described in U. S. Letters Patent 1,605,180, issued November 2, 1926, and is preferably an isomer of rubber, which is a rubber derivative and cannot be classed as a vulcanized rubber, nor rubber itself, because its chemical unsaturation is different from rubber.

The isomer of rubber may be dissolved in benzol, toluene or some other suitable solvent, to the proper or desired consistency, forming a cement or adhesive, and is then applied to a suitable material which forms a base or backing. Before the complete evaporation of the solvents in the isomeric composition, and while such composition which constitutes the adhesive, cement, or binding agent is still "tacky," abrasive grit grains are applied to the surface thereof, that is, the surface of the isomer bonding agent. In some instances, where deemed necessary, a suitable plasticizing agent may be incorporated in the solution of rubber isomer before being applied to the backing, so as to prevent cracking or breaking of the finished abrasive paper which would occur by reason of any excessive brittleness. A plasticizing agent which has been found to be efficient for this purpose is ethyl abietate, but it is to be understood that it is not desired to be limited to this particular plasticizer, as other plasticizing agents suitable for the purpose may be employed and come within the scope of this invention.

There are two grades of rubber isomer which have been found satisfactory for this purpose, to-wit: (A) which is a tough, non-friable, heat plastic rubber derivative, the physical properties of which are said to be substantially as follows:

(Type A),
Specific gravity .97 to 1.00.
Smaller cold flow than gutta percha or balata.
Tensile strength (at 22° C): 1,000 to 5,000 lbs. per sq. in.
Ultimate compression strength: About 3,500 to 8,000 lbs. per sq. in.
Melting point: Somewhat indefinite, but not substantially higher than 275° C.
Chemically less unsaturated than rubber approximately to the extent of 67%.

The other of which (Type B) is as follows: A hard, brittle, pulverizable, shellac-like material.
Melting point: About 275° C.
Specific gravity: About .989 to 1.005.
Tensile strength: About 570 lbs. per sq. in.
Impact strength: Higher than shellac.
Relatively stable under atmospheric conditions.

These particular isomers of rubber are practically insoluble in alcohol; ether, acetone, glacial acetic acid; amylacetate; water, dilute acids and alkalies.

If either of these products, to-wit: A or B, is melted, the chemical properties, as well as physical characteristics, will be altered, becoming chemically less unsaturated, the balata-like product becoming brittle and more or less similar to the shellac-like product, and the shellac-like product when melted, losing considerable of its strength. However, as the softening point is not substantially changed by repeated heating, within the range of plasticity, nor by placing the materials in solution, it is possible to rework them in a variety of ways without altering their chemical characteristics.

Due to oxidation, of gums and oils, which causes brittleness in certain types of waterproof sandpaper, occurring after sandpaper has remained unused, or kept in stock for any considerable period of time, the paper will lose considerable of its flexibility and pliability. This objection has caused many efforts to be exerted in finding or producing a material which is superior to the ordinary resins, gums, oils and varnishes which have usually been employed in many of the prior or disclosed formulas for use in the manufacture of sand or abrasive papers.

With the present invention, and by the use of an isomeric composition, such as an isomer of rubber, the use of a gum, oil, resin or varnish heretofore employed in formulas for other types of adhesive materials used on abrasive papers, is dispensed with. This eliminates various different stages or steps of processing found so necessary when other types of bonding agents of more complicated structure, or ones employing certain resins, gums, oils and varnishes, are used, and reduces the number of steps of operation in producing sandpaper of the waterproof type. This is occasioned by the fact that among other new properties above emphasized, the isomer of rubber has a specific adhesion to abrasive mineral particles, greater than rubber and shellac, making more difficult displacement or extraction of the grains from the abrasive article and permitting a lower ratio of bond to mineral abrasive particles, whereby an abrasive article of greater abrasive power or of increased cutting power may be obtained.

Having thus described my invention and illustrated its use, what I claim as new and desire to secure by Letters Patent is:

1. For use in the manufacture of a flexible abrading element, an isomeric composition of a rubber derivative as a securing means for the grit particles and having a substantially constant softening point under repeated heating involved in abrading operations and having specific adhesion to abrasive particles, greater than binders of the class including rubber and shellac, whereby a lower ratio of bond may be used without diminishing the strength of bond, and thereby increasing the abrasive power of the abrasive article.

2. For use in the manufacture of a flexible abrading element, an isomer of rubber as an anchoring means for the grit particles and having a substantially constant softening point under repeated heating involved in abrading operations and having specific adhesion to abrasive particles, greater than binders of the class including rubber and shellac, whereby a lower ratio of bond may be used without diminishing the strength of bond, and thereby increasing the abrasive power of the abrasive article.

3. For use in the manufacture of a flexible abrading element, an artificial isomer of undissolved rubber having less chemical unsaturation than rubber as a means for anchoring the grit particles, and a plasticizing agent in the anchoring means to impart flexibility thereto and having a substantially constant softening point under repeated heating involved in abrading operations and having specific adhesion to abrasive particles, greater than binders of the class including rubber and shellac, whereby a lower ratio of bond may be used without diminishing the strength of bond, and thereby increasing the abrasive power of the abrasive article.

4. For use in the manufacture of flexible abrasive material, a water resistant grit anchoring adhesive embodying an isomer of rubber cement and having a substantially constant softening point under repeated heating involved in abrading operations and having specific adhesion to abrasive particles, greater than binders of the class including rubber and shellac, whereby a lower ratio of bond may be used without diminishing the strength of bond, and thereby increasing the abrasive power of the abrasive article.

5. As an article of manufacture, a flexible abrading element comprising a flexible base, abrading particles and a binder of an isomer of rubber securing the abrading particles to said base and having a substantially constant softening point under repeated heating involved in abrading operations and having specific adhesion to abrasive particles, greater than binders of the class including rubber and shellac, whereby a lower ratio of bond may be used without diminishing the strength of bond, and thereby increasing the abrasive power of the abrasive article.

6. As a new article of manufacture, sandpaper comprising a flexible fibrous backing, a layer of abrasive grits, and a binder coat for uniting said grits to said backing, said binder coat comprising a rubber isomer and having a specific adhesion to abrasive grits substantially greater than bonds or binders consisting of rubber.

7. As an article of manufacture, a flexible abrading element comprising a flexible base, abrading particles, and a binder of an isomer of rubber and a plasticizing agent securing the abrading particles to said base and having a substantially constant softening point under repeated heating involved in abrading operations and having specific adhesion to abrasive particles, greater than binders of the class including rubber and shellac, whereby a lower ratio of bond may be used without diminishing the strength of bond, and thereby increasing the abrasive power of the abrasive article.

8. As an article of manufacture, a flexible abrading element comprising a flexible base, abrading particles, and an adhesive of an isomer of rubber and ethyl abietate securing the base and abrading particles together and having a substantially constant softening point under repeated heating involved in abrading operations and having specific adhesion to abrasive particles, greater than binders of the class including rubber and shellac, whereby a lower ratio of bond may be used without diminishing the strength of bond, and thereby increasing the abrasive power of the abrasive article.

9. As an article of manufacture, a flexible abrading element comprising a flexible base, grit particles, and an artificial isomer of undissolved rubber having less chemical unsaturation than rubber, anchoring the grit particles to the base and having a substantially constant softening point under repeated heating involved in abrading operations and having specific adhesion to abrasive particles, greater than binders of the class including rubber and shellac, whereby a lower ratio of bond may be used without dimishing the strength of bond, and thereby increasing the abrasive power of the abrasive article.

10. As a new article of manufacture, sandpaper comprising a flexible fibrous base, abrasive grits and a water-resistant binder coat for uniting said abrasive grits to said base, said binder coat comprising an isomer of rubber having less chemical unsaturation than rubber and having a specific adhesion to abrasive grits substantially greater than bonds or binder coats consisting of rubber.

11. As an article of manufacture, a flexible abrading element comprising a flexible base, grit particles, and a flexible anchoring means for the grit particles, said anchoring means embodying an isomer of rubber and a plasticizing agent and having a substantially constant softening point under repeated heating involved in abrading operations and having specific adhesion to abrasive particles, greater than binders of the class including rubber and shellac, whereby a lower ratio of bond may be used without diminishing the strength of bond, and thereby increasing the abrasive power of the abrasive article.

12. As an article of manufacture, a flexible abrading element comprising a flexible base, grit particles, and an artificial isomer of undissolved rubber having less chemical unsaturation than rubber and a plasticizing agent securing the grit particles and base together and having a substantially constant softening point under repeated heating involved in abrading operations and having specific adhesion to abrasive particles, greater than binders of the class including rubber and shellac, whereby a lower ratio of bond may be used without diminishing the strength of bond, and thereby increasing the abrasive power of the abrasive article.

13. As an article of manufacture, a flexible abrading element comprising a base, grit particles, and a water resistant adhesive securing the grit particles and base together and comprising an isomer of rubber and having a substantially constant softening point under repeated heating involved in abrading operations and having specific adhesion to abrasive particles, greater than binders of the class including rubber and shellac, whereby a lower ratio of bond may be used without diminishing the strength of bond, and thereby increasing the abrasive power of the abrasive article.

HOWARD G. BARTLING.